(12) United States Patent
Kim et al.

(10) Patent No.: US 9,034,528 B2
(45) Date of Patent: May 19, 2015

(54) MEMBRANE HUMIDIFIER FOR FUEL CELL

(75) Inventors: Hyun Yoo Kim, Gyeonggi-do (KR);
Hyuck Roul Kwon, Gyeonggi-do (KR)

(73) Assignees: Hyundai Motor Company, Seoul (KR);
Kia Motors Corporation, Seoul (KR)

( * ) Notice: Subject to any disclaimer, the term of this patent is extended or adjusted under 35 U.S.C. 154(b) by 157 days.

(21) Appl. No.: 13/309,910

(22) Filed: Dec. 2, 2011

(65) Prior Publication Data
US 2013/0065140 A1    Mar. 14, 2013

(30) Foreign Application Priority Data
Sep. 14, 2011 (KR) .................... 10-2011-0092686

(51) Int. Cl.
*H01M 8/06* (2006.01)
*B01D 63/04* (2006.01)
*H01M 8/04* (2006.01)

(52) U.S. Cl.
CPC ........... *B01D 63/04* (2013.01); *H01M 8/04141* (2013.01); *H01M 8/04149* (2013.01); *B01D 2319/04* (2013.01); *Y02E 60/50* (2013.01)

(58) Field of Classification Search
USPC ............... 429/413, 26; 261/102, 104
See application file for complete search history.

(56) References Cited

U.S. PATENT DOCUMENTS

| 2007/0172716 A1* | 7/2007 | Frederiksen et al. ........... 429/38 |
| 2008/0093752 A1* | 4/2008 | Jeon .............................. 261/100 |
| 2009/0226784 A1* | 9/2009 | Kim ............................... 429/26 |

FOREIGN PATENT DOCUMENTS

| JP | 2002289229 A | 10/2002 |
| JP | 2004-165063 A | 6/2004 |
| JP | 2004209418 A * | 7/2004 |
| JP | 2005158517 A | 6/2005 |
| JP | 2007051797 A | 3/2007 |
| KR | 10-2008-0029285 | 4/2008 |
| KR | 10-2010-0100325 | 9/2010 |
| KR | 10-2011-0060048 | 6/2011 |

OTHER PUBLICATIONS

English translation of 2004209418, Kawabata, Jul. 2004, Japan.*

* cited by examiner

*Primary Examiner* — Jonathan Jelsma
*Assistant Examiner* — Rashid Alam
(74) *Attorney, Agent, or Firm* — Mintz Levin Cohn Ferris Glovsky and Popeo, P.C.; Peter F. Corless

(57) ABSTRACT

Disclosed is a membrane humidifier for a fuel cell, which uniformly humidifies entire hollow fiber membranes from an outer side to a central portion of an interior of the membrane humidifier to improve the distribution of wet air and dry air, thereby improving a humidification performance. The membrane humidifier for the fuel cell includes a hollow upper case including first wet air inlet apertures and first wet air outlet apertures and a membrane module assembly including a plurality of unit membrane modules received lengthwise within the upper case along the flow direction of dry air.

8 Claims, 8 Drawing Sheets

⇐ : WET AIR

⇐ : DRY AIR

⬅ : HUMIDIFIED DRY AIR

LEAN TO ONE SIDE

MEMBRANE HUMIDIFIER FOR FUEL CELL

CROSS-REFERENCE TO RELATED APPLICATION

This application claims under 35 U.S.C. §119(a) the benefit of Korean Patent Application No. 10-2011-0092686 filed Sep. 14, 2011, the entire contents of which are incorporated herein by reference.

BACKGROUND (a) Technical Field

The present invention relates to a membrane humidifier for a fuel cell. More particularly, it relates to a membrane humidifier for a fuel cell, which uniformly humidifies entire hollow fiber membranes from outer sides of the membrane to a central portion of the interior of the membrane humidifier to improve the distribution of wet air and dry air, thereby improving the humidification performance.

(b) Background Art

Fuel cell stack operation requires humidifying a polymer electrolyte membrane within the fuel cell stack. Accordingly, the fuel cell employs a membrane humidifier operated by moisture exchange between moisture from exhaust gas, which is a wet air discharged from the fuel cell stack, and dry air supplied from outside (e.g., environmentally supplied cool air.)

There are several types of humidifiers, such as a bubbler-type humidifier, an injection-type humidifier, and a humidifier using an adsorbent. However, since there is only a limited space on the package surface of a fuel cell vehicle, a small-sized membrane humidifier requiring no special power is used in the fuel cell. In particular, a membrane humidifier using hollow fiber membranes has been suitably used for a membrane humidifier for a fuel cell.

As illustrated in FIG. 5, a membrane humidifier 100 is included in an air supply system for supplying air (oxygen) to a fuel cell stack 200 of a fuel cell system, exterior dry air is supplied to the membrane humidifier 100 by an inhalation of an air blower 202 and exhaust gas discharged from the fuel cell stack 200 passes through an interior of the membrane humidifier 100 at the same time. At this time, the dry air is humidified while moisture contained in the exhaust gas passes through hollow fiber membranes within the membrane humidifier 100.

A conventional membrane humidifier including the hollow fiber membranes and its operation will be described with reference to FIG. 6 in more detail. As illustrated in FIG. 6, the conventional membrane humidifier 100 includes a housing 101. The housing 101 has a first inlet 102 for introducing dry air and a first outlet 103 for discharging humidified dry air. A hollow fiber membrane bundle 107 including a plurality of dense hollow fiber membranes 106 is received within the housing 101. Further, the housing 101 includes a second inlet 104 for inducing wet air discharged from the fuel cell stack and a second outlet 105 for discharging wet air at an opposite side thereof.

In operation, when discharged gas, i.e., wet air, reacted completely and discharged from the fuel cell stack is supplied to a side of the hollow fiber membrane bundle 107 from the second inlet 104 of the housing 101, moisture contained in the wet air is separated by a capillary action of each of the hollow fiber membranes 106 and the separated moisture is condensed while being permeated into the capillaries of the hollow fiber membranes 106 to move to the interior of the hollow fiber membranes 106. Subsequently, the wet air from which moisture is separated directly flows along the outside the hollow fiber membranes 106 and is discharged through the second outlet 105 of the housing 101.

In the meantime, exterior air (dry air) is supplied to the housing 101 through the first inlet 102 by force of the air blower and the exterior air supplied through the first inlet 102 flows through the interiors of the hollow fiber membranes 106. At this time, since the moisture separated from the wet air has already flowed to the interiors of the hollow fiber membranes 106, the dry air is humidified by the moisture and the humidified dry air is supplied to the side of the fuel cell stack through the first outlet 103.

However, since the hollow fiber membrane bundle 107 is very compact and has a plurality of dense hollow fiber membranes 106 therein, it is difficult for the wet air introduced through the second inlet 104 to permeate into the hollow fiber membrane bundle 107. Further, the diffusion rate of the wet air through the hollow fiber membranes is very slow, and thus it is very difficult for the wet air to permeate into the interiors of the hollow fiber membranes.

In particular, the wet air being passed through the outside of the hollow fiber membrane bundle 107 within the housing 101 often fails to permeate into a central portion of the hollow fiber membrane bundle 107 within the housing 101 as indicated with a dotted line in FIGS. 8 and 9 but mainly flows through an edge portion as indicated with an arrow in FIGS. 8 and 9. Thus, the diffusion rate of the wet air to the central portion of the hollow fiber membrane bundle 107 is very slow, thereby causing deterioration of humidification efficiency for dry air.

Further, since the large quantity of dry air introduced through the first inlet 102 of the housing 101 mainly flows through the central portion of the hollow fiber membrane bundle 107 (a part indicated with hidden lines in FIGS. 6 and 7), the hollow fiber membranes within the humidifier are under utilized and the general humidification efficiency of the humidifier is further deteriorated.

Thus, due to the above problems, the hollow fiber membranes 106 located at the central portion of the hollow fiber membrane bundle 107 fail to receive a sufficient amount of moisture, thus deteriorating general efficiency of the humidifier.

Such a problem can be identified through a simulation experimental result in FIG. 8. It can be clearly seen from FIG. 8 that most of the dry air flows through only the central portion of the hollow fiber membrane bundle 107. That is, the dry air introduced through the first inlet 102 of the housing 101 mainly flows through the central portion (a part indicated with hidden lines in FIGS. 6 and 7) of the hollow fiber membrane bundle 107 and the wet air introduced through the second inlet 104 flows through the edge portion of the hollow fiber membrane bundle 107. Accordingly, the humidification efficiency of the membrane humidifier is deteriorated, which further affects when the flow of the dry air is increased, i.e., a high power is output from the fuel cell stack.

As described above, the wet air supplied to the membrane humidifier is discharged after a reaction in the fuel cell, and water generated in the reaction, as well as vapor, is also supplied to the membrane humidifier together with the wet air. Therefore, in cold weather, water introduced into the membrane humidifier freezes and prevents the hollow fiber membranes from suitably performing its humidification activity. In addition, in cold weather the membrane humidifier can be used only after the frozen moisture of the hollow fiber membranes is melted. Further, since surfaces of the hollow fiber membranes of the conventional membrane humidifier are repeatedly frozen and melted, the hollow fiber membranes on the outer sides, i.e., the edge portions, of the hollow fiber membrane bundle 107 through which the wet air mainly flows are damaged or become disconnected (see FIG. 9).

Referring to FIG. 9, the hollow fiber membrane bundle 107 including the dense hollow fiber membranes 106 is mounted within the housing 101 of the membrane humidifier. In this case, opposite ends of the hollow fiber membrane bundle 107 are fixed to ends of an interior of the housing 101 by a potting material 108, so that the hollow fiber membrane bundle 107 is fixed. Therefore, disconnection of the hollow fiber membranes at the outer sides may occur due to a damage or breakage of the potting material 108 located on an outside end of the hollow fiber membrane bundle 107 through which the wet air mainly flows.

Even further, if the surfaces of the hollow fiber membranes are repeatedly frozen and melted to the extent that they become damaged, the damaged hollow fiber membranes eventually have a drastic effect on a performance of the fuel cell stack, and thus it is necessary to change the entire membrane humidifier.

Additionally, in manufacturing of the membrane humidifier, a large portion of the membrane humidifier is made of expensive hollow fiber membranes formed of a polymer material. In order to improve the humidification performance, more hollow fiber membrane bundles are used than necessary, thus increasing the manufacturing cost. In addition, due to the use of many hollow fiber membrane bundles, the size of the membrane humidifier is disproportionate compared to the performance of the membrane humidifier.

Furthermore, since the conventional membrane humidifier includes a single hollow fiber membrane module within which a plurality of hollow fiber membranes is received in the form of a bundle, the hollow fiber membranes are not uniformly distributed within the housing and are weighted to one side of the housing during manufacturing the membrane humidifier (see FIG. 10).

SUMMARY OF THE DISCLOSURE

The present invention provides a membrane humidifier for a fuel cell, in which cartridge-shaped unit membrane modules having various diameters are received within an upper case of the membrane humidifier to improve distribution of wet air and dry air, whereby the entirety of dry air from an outer sides to a central portion of the unit membrane module is uniformly humidified, thereby improving an air humidification performance.

In one aspect, the present invention provides a membrane humidifier for a fuel cell, including: a hollow upper case including first wet air inlet apertures or ducts and first wet air outlet apertures or ducts; and a membrane module assembly including a plurality of unit membrane modules received lengthwise within the upper case along the flow direction of dry air.

In an exemplary embodiment, the membrane module assembly includes at least two unit membrane modules having different diameters. The membrane module assembly includes a unit membrane module having a relative small diameter and disposed at a central portion of the upper case and unit membrane modules having diameters which become gradually larger than that of the unit membrane module disposed at a portion of the upper case as they go from the center to the outer sides of the upper case.

In still another exemplary embodiment, the unit membrane module includes a hollow lower case including second wet air inlet apertures and second wet air outlet apertures at outer peripheral portions of opposite ends thereof and a hollow fiber membrane bundle received lengthwise within the hollow lower case along the flow direction of dry air.

Accordingly, the membrane humidifier for the fuel cell of the present invention includes the cartridge-shaped unit modules having different diameters received within the upper case to improve distribution of wet air and dry air, thereby uniformly humidifying the entirety the dry air from the outer sides to the central portion of the membrane humidifier and thus improving the vehicle's humidification performance.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Hereinafter reference will now be made in detail to an embodiment of the present invention, examples of which are illustrated in the accompanying drawings and described below.

It is understood that the term fuel cell "vehicle" or "vehicular" or other similar term as used herein is inclusive of all types of fuel cell motor vehicles in general such as passenger automobiles including sports utility vehicles (SUV), buses, trucks, various commercial vehicles, watercraft including a variety of boats and ships, aircraft, and the like, and includes hybrid fuel cell vehicles, electric motor powered fuel cell vehicles, auxiliary plug-in fuel cell hybrid electric vehicles, hydrogen-powered fuel cell vehicles and other alternative fuel cell vehicles (e.g., fuels derived from resources other than petroleum).

Figure 6:
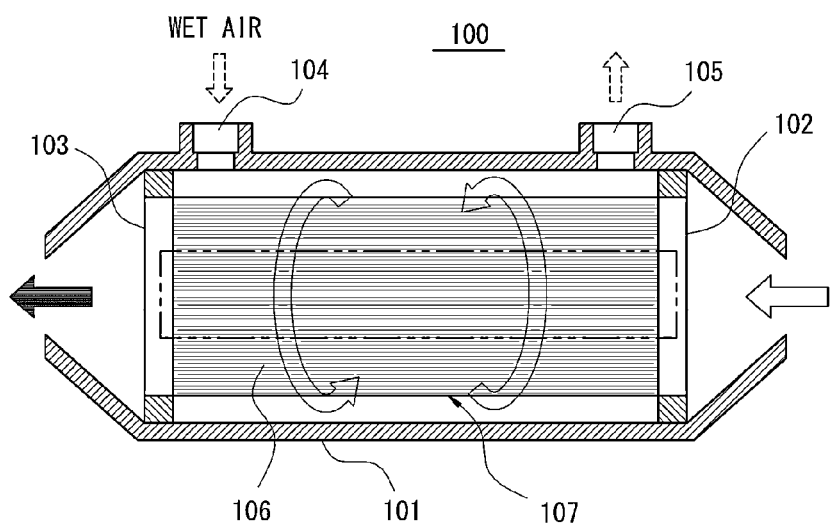
FIG. 6 is a sectional view illustrating a humidification principle of a conventional membrane humidifier for a fuel cell.
Figure 7:
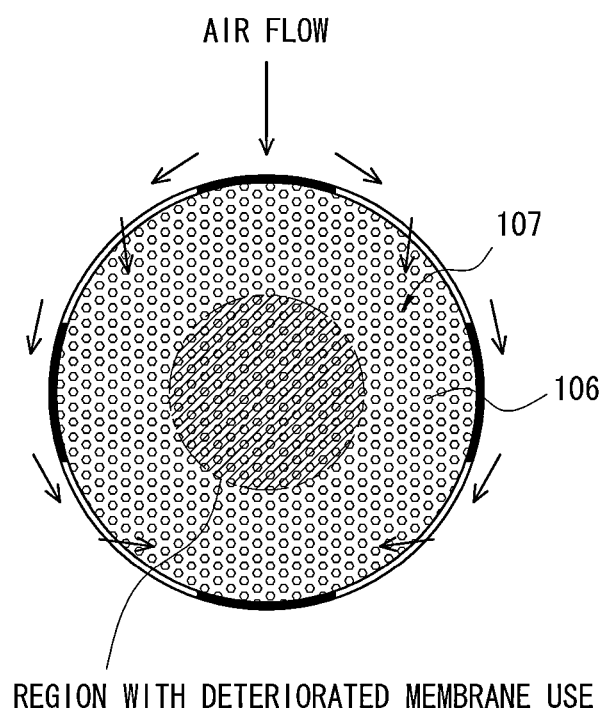
FIG. 7 is a sectional view illustrating a flow of wet air in the conventional membrane humidifier for the fuel cell.
Figure 8:
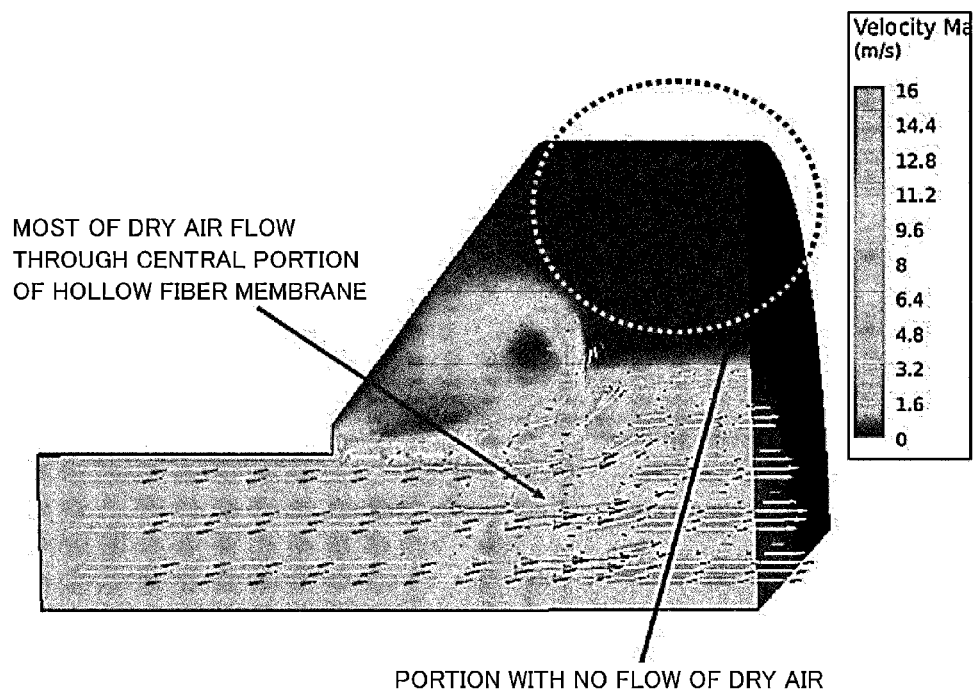
FIG. 8 is a simulation experimental result graph explaining a problem generated in the conventional membrane humidifier for the fuel cell.
Figure 9:
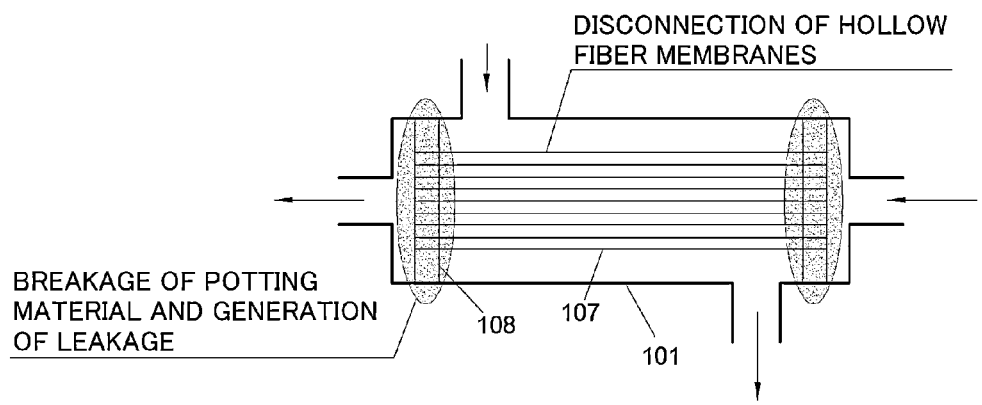
FIGS. 9 and 10 are views schematically illustrating a problem of the conventional membrane humidifier of the fuel cell.

As already described with reference to FIG. 6, the conventional membrane humidifier for the fuel cell humidifies dry air through moisture exchange using the hollow fiber membrane bundle 107 mounted therein. In this case, the dry air (exterior air) mainly flows along the interiors of the hollow fiber membranes arranged at the central portion of the hollow fiber membrane bundle 107 and the wet air discharged from the fuel cell stack after a reaction mainly flows along the outer surfaces of the hollow fiber membranes arranged at the outer sides of the hollow fiber membrane bundle 107. As such, the conventional membrane humidifier for a fuel cell has a structural imbalance inevitably causing the decrease of a contact degree between the dry air and the wet air, thereby causing deterioration of use of the hollow fiber membranes and a reduced humidification efficiency of the humidifier.

Accordingly, the present invention includes cartridge-shaped unit membrane modules 16, 17, and 18 having various diameters within an upper case 10 of a membrane humidifier, to channel wet air smoothly flow through the entirety of the humidifier from an outer side to a central portion of the upper case 10 and induce the flow of dry air to the outer side of the upper case 10, thereby providing uniform humidification of the hollow fiber membranes.

To this end, the membrane humidifier for the fuel cell according to the present invention includes the hollow upper case 10 and a plurality of unit membrane modules 16, 17, and 18 received lengthwise within the upper case 10 along the flow direction of dry air. The unit membrane modules 16, 17, and 18 are received within the upper case 10 in the form of a bundle to form a membrane module assembly 15. Each of the unit membrane modules 16, 17, and 18 are formed by mounting a hollow fiber membrane bundle 23 within a lower case 20 and modularizing the hollow fiber membrane bundle 23 in a cartridge shape, and a plurality of unit membrane modules 16, 17, and 18 are mounted within the upper case 10. The plurality of unit membrane modules 16, 17, and 18, i.e., the membrane module assembly 15, mounted within the upper case 10, include at least two of unit membrane modules 16, 17, and 18 having different diameters.

Preferably, the membrane module assembly 15 includes the unit membrane module 16 which has a relatively small diameter in comparison to the diameters of the unit membrane modules located more towards the outer surface of the assembly 15. These relatively small modules are disposed at a central portion of the upper case 10. The unit membrane modules 17 and 18 have diameters which become gradually larger as the unit membrane modules go from the central portion to the outer side of the upper case 10.

Hereinafter, an embodiment of the membrane module assembly including unit membrane modules having three different diameters will be described in detail.

Figure 1:
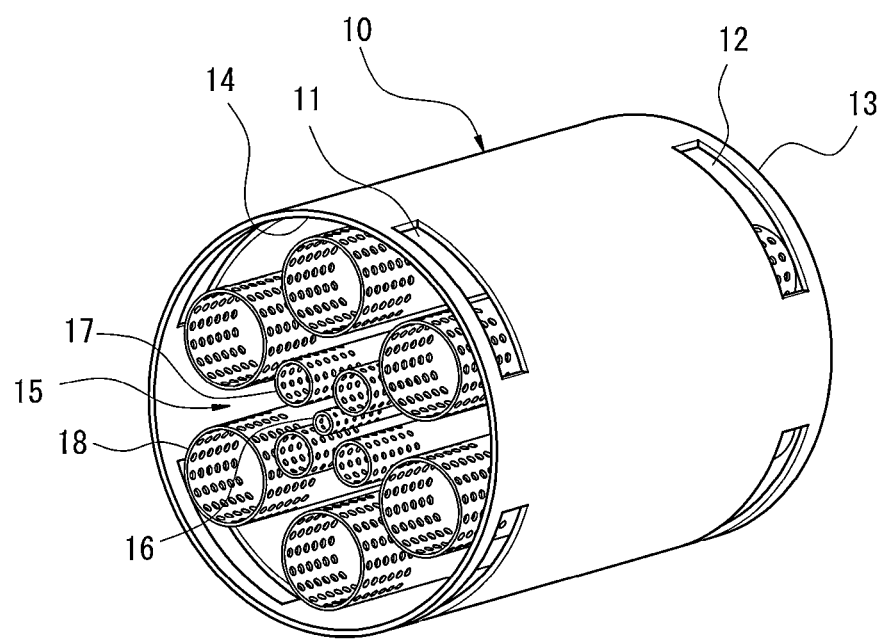
FIGS. 1 and 2 are perspective views schematically illustrating a membrane humidifier for a fuel cell according to an exemplary embodiment of the present invention.
Figure 2:
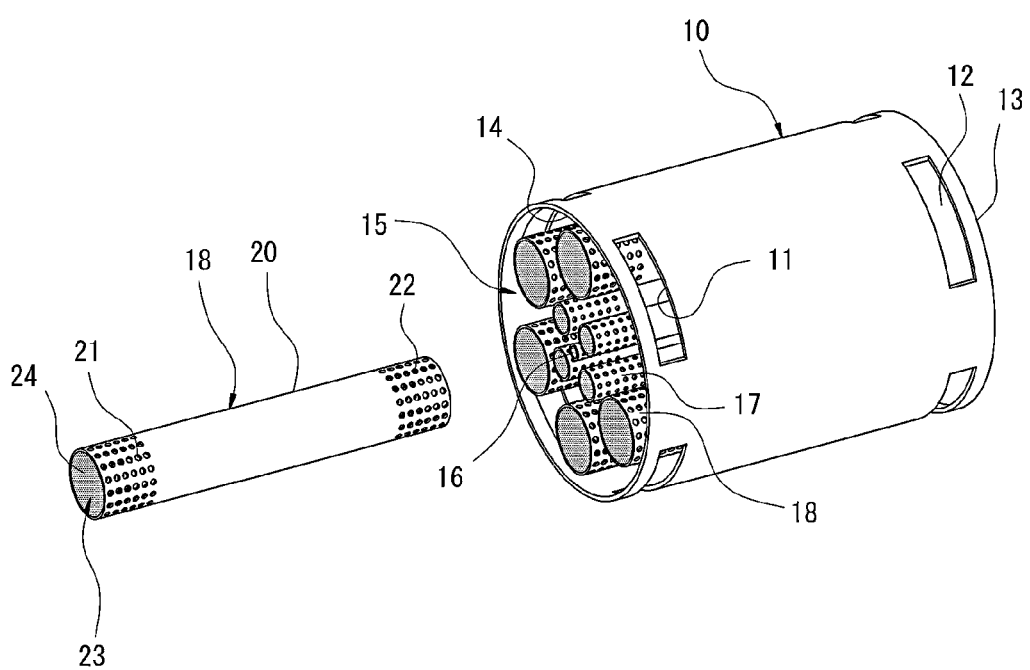
Figure 3:
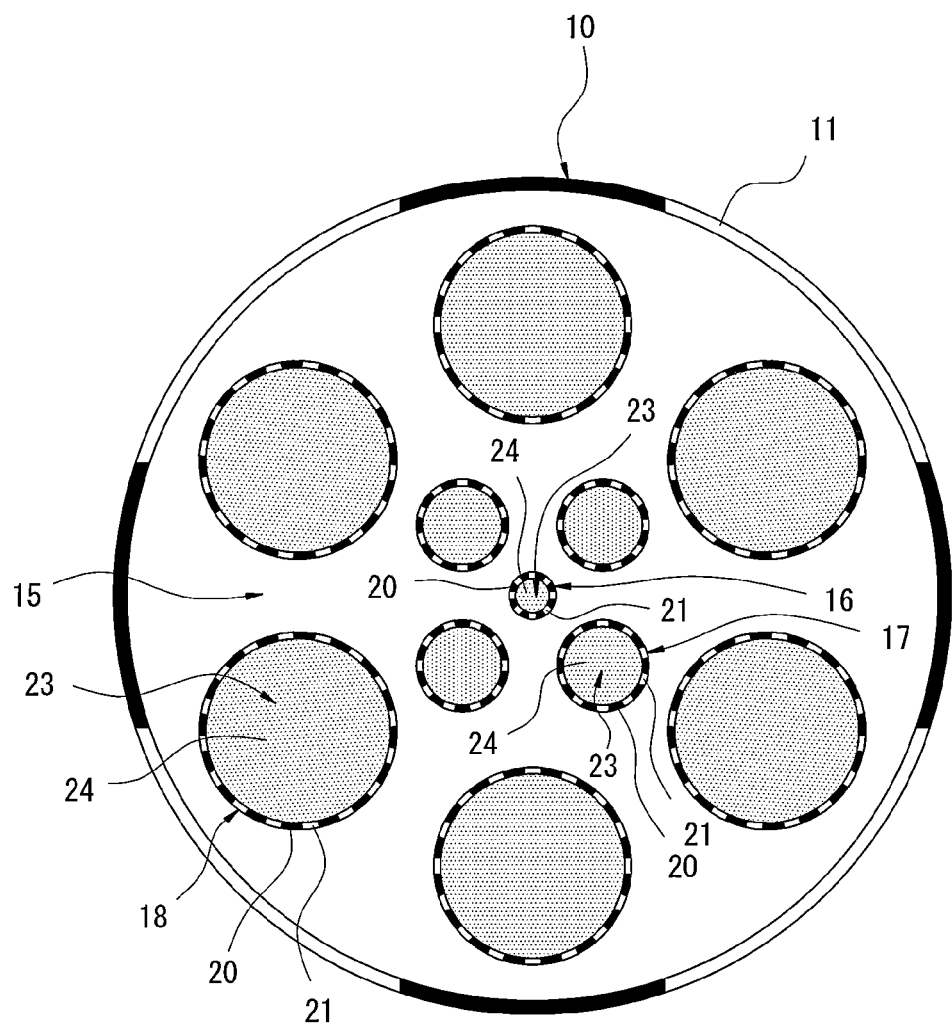
FIG. 3 is a sectional view schematically illustrating the membrane humidifier for the fuel cell of FIG. 1 according to the exemplary embodiment of the present invention.

As illustrated in FIGS. 1 to 3, the membrane humidifier according to the embodiment of the present invention includes the hollow upper case 10 and the membrane module assembly 15 mounted within the upper case 10. The membrane module assembly 15 includes the plurality of bundle-shaped unit membrane modules 16, 17, and 18. Each of the unit membrane modules 16, 17, and 18 includes the hollow lower case 20 and the hollow fiber membrane bundle 23 received lengthwise within the lower case 20 along the flow direction of dry air.

That is, the membrane module assembly 15 includes the plurality of unit membrane modules 16, 17, and 18 having different diameters. Particularly, the membrane module assembly 15 includes the first membrane module disposed at the central portion of the upper case 10, the third membrane modules 18 circumferentially disposed at the outer side of the upper case 10, and the second membrane modules 17 circumferentially disposed between the first membrane module 16 and the third membrane modules 18.

The first membrane module 16 is configured to have the smallest diameter, compared to those of the second membrane module 17 and the third membrane module 18, and the second membrane module 17 has a diameter relatively smaller than that of the third membrane module 18, That is, in the membrane module assembly 15, the unit membrane module 16 having the smallest diameter among the unit membrane modules 16, 17, and 18 mounted within the upper case 10 is disposed at the central portion of the upper case 10, and the unit membrane modules having diameters which become gradually larger as they go from the central portion to the outer side of the upper case 10.

Accordingly, dry air introduced by an air blower is induced to the outer side at which the membrane module (which includes more hollow fiber membranes therein in comparison with another unit membrane module having a smaller diameter) having a larger diameter is located and dry air mainly flowing through the central portion of the upper case 10 is distribution-induced to the outer side of the upper case 10, so that the distribution of the dry air can be improved.

Further, the wet air introduced into the upper case 10 flows between the unit membrane modules 16, 17, and 18 circumferentially arranged in a bundle shape to be delivered to the unit membrane module located at the central portion of the upper case 10, as well as the outer side of the upper case 10. Accordingly, the wet air is supplied to the entire unit membrane modules 16, 17, and 18 so that the distribution of the wet air is improved, and moisture contained in the wet air supplied to each of the unit membrane modules 16, 17, and 18 is separated by a capillary action of the hollow fiber membranes 24 mounted within the lower case 20 to flow into the hollow fiber membranes 24.

The moisture flown into the hollow fiber membrane 24 humidifies the dry air flowing through the interiors of the hollow fiber membranes 24. Accordingly, the present invention can solve a problem caused when the main flow of the air is through a central portion of a hollow fiber membrane bundle and the main flow of wet air is through an outer side of a hollow fiber membrane bundle, and thus it induces the uniform humidification for the entire hollow fiber membranes 24 received within the unit membrane modules 16, 17, and 18 within the upper case 10, to improve a humidification performance.

For reference, although it is not illustrated, the unit membrane modules 16, 17, and 18 may be fixed to the interior of the upper case 10 by a potting material. The potting material is used for fixing the hollow fiber membrane bundle to the interior of the hollow fiber membrane module.

In the meantime, as illustrated in FIG. 2, for introduction and discharge of the wet air, the upper case 10 includes a plurality of first wet air inlet apertures 11 and a plurality of first wet air outlet apertures 12 at outer sides at opposite ends thereof in a circumferential direction of the upper case 10, and the lower case 20 includes a plurality of second wet air inlet apertures 21 and a plurality of second wet air outlet apertures 22 at outer peripheral portions at opposite ends thereof in a circumferential direction.

In particular, the plurality of second wet air inlet apertures 21 and the plurality of second wet air outlet apertures 22 are circumferentially formed at opposite ends of the lower case 20 and are also formed in a plurality of rows in a lengthwise or vertical direction of the lower case 20 along a predetermined section.

During operation of the membrane humidifier having the aforementioned construction, wet air discharged from the fuel cell stack after a reaction is introduced into the first wet air inlet apertures 11 of the housing 10 to pass through the spaces between the unit membrane modules 16, 17, and 18 and then the wet air flows through the unit membrane module located on the outer sides of the upper case 10 up to the unit membrane module located at the central portion of the upper case 10, to uniformly deliver dry air and wet air throughout the entire interior of the upper case 10.

Figure 4:
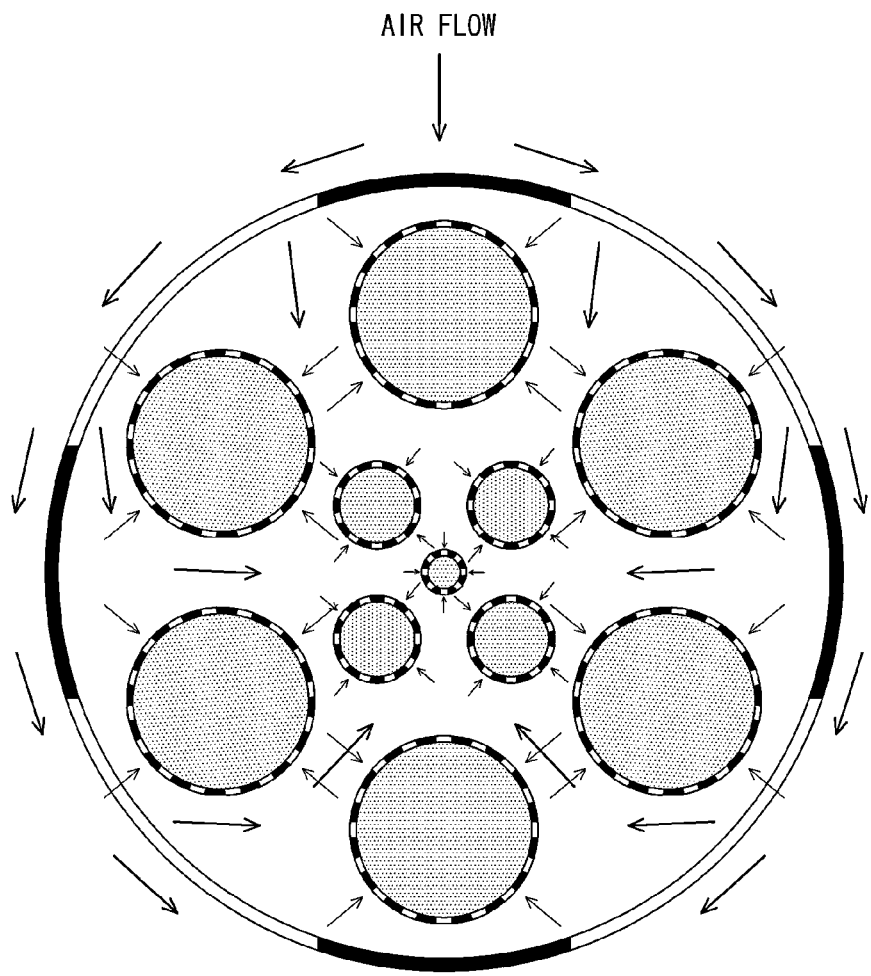
FIG. 4 is a view schematically illustrating a flow of wet air in the membrane humidifier for the fuel cell according to the exemplary embodiment of the present invention.
Figure 5:
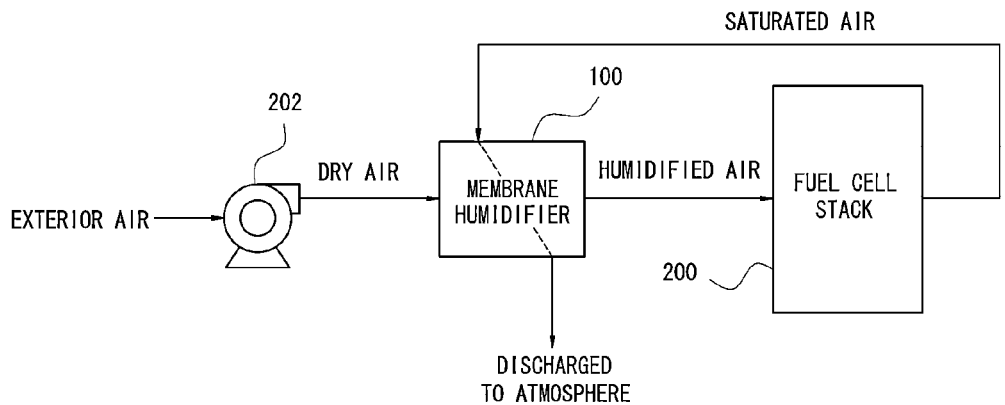
FIG. 5 is a view schematically illustrating an air supply system of the fuel cell system.

The wet air delivered each of the unit membrane modules 16, 17, and 18 is introduced through the second wet air inlet aperture 21 of the lower case 20 as shown in FIG. 4, so that moisture contained in the wet air can be separated by a capillary action of the included hollow fiber membranes 24, and the separated moisture is condensed while being passed through capillary tubes of the hollow fiber membranes 24 to flow into the hollow fiber membranes 24.

In the meantime, when exterior air (dry air) is introduced into the upper case 10 according to the force of the air blower, the dry air introduced through an opening 13 at one opposite end of the upper case 10 is distribution-induced to the outer side at which the unit membrane module having a large diameter is located to be uniformly distributed and flow from the central portion to the outer side of the upper case 10 and is introduced into the hollow fiber membranes 24 of each of the unit membrane modules 16, 17, and 18 to flow along the interiors of the hollow fiber membranes 24.

Since the moisture separated from the wet air has flown into the hollow fiber membranes 24, the dry air is humidified by the separated moisture, and the humidified dry air is discharged through an opening 14 at another opposite end of the upper case 10 to be supplied to a side of the fuel cell stack. The wet air from which the moisture is separated flows along the outside of the hollow fiber membrane bundle 23 of the unit membrane modules 16, 17, and 18 and is discharged through the second wet air outlet apertures 22 of the lower case, to be discharged to the atmosphere through the second wet air outlet apertures 12 of the upper case 10.

Accordingly, the membrane humidifier for the fuel cell of the present invention has the following effects.

1. The cartridge-shaped unit membrane modules having various diameters are received within the upper case and the unit membrane modules having diameters which become gradually larger as the modules go from the center portion to the outer side of the upper case of the upper case. Accordingly, the distribution of wet air and dry air is improved so that the entire hollow fiber membranes are uniformly humidified, and thus the use of the membrane is increased and the humidification performance is improved.

2. Through the improvement of the distribution of the wet air, the present invention prevents damage or disconnection of the hollow fiber membranes at the outer side due to the main flow of the wet air through the outer side of the hollow fiber membrane bundle in the conventional membrane humidifier.

Figure 10:
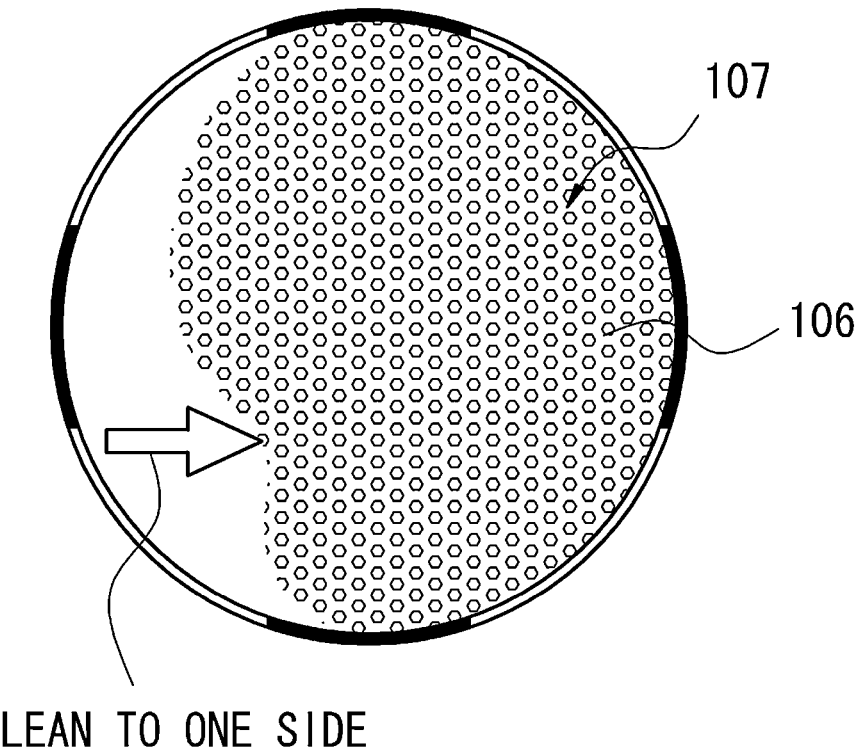

3. In the conventional membrane humidifier, a plurality of hollow fiber membranes is received within the housing in a shape of a large bundle, thereby preventing uniform distribution through hollow fiber membranes, such as they are weighted to one side of the housing (see FIG. 10). However, in the membrane humidifier of the present invention, a plurality of cartridge-shaped unit membrane modules including small bundle-shaped hollow fiber membrane bundles are received within the upper case, so that the entire hollow fiber membranes can be uniformly distributed in manufacturing the membrane humidifier, thereby solving a conventional problem of the non-uniform distribution of the hollow fiber membranes.

4. In the event of the generation of a problem due to the damage or disconnection of the hollow fiber membranes, it is possible to replace only the unit membrane module including the hollow fiber membrane having the problem, thereby greatly reducing replacement costs of the unit membrane module.

5. According to the improvement of the humidification performance, it is possible to reduce the number of strips of the hollow fiber membranes used in manufacturing a membrane humidifier, save manufacturing costs compared to the conventional membrane humidifier, and decrease a size of the membrane humidifier, thereby having a more efficient packaging component than that of the conventional art.

6. The present invention uses the cartridge-shaped unit membrane modules to improve the distribution of the wet air, thereby decreasing an amount of pressure drop applied to the unit membrane modules within the humidifier and thus decreasing a load of the air blower.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A membrane humidifier for a fuel cell, comprising:
a hollow upper case including a plurality of first wet air inlet apertures and a plurality of first wet air outlet apertures; and
a membrane module assembly including a plurality of unit membrane modules separated from each other and received lengthwise within the hollow upper case along a flow direction of dry air,
wherein each of the plurality of unit membrane modules comprise a hollow lower case surrounding a hollow fiber membrane bundle received lengthwise within the hollow lower case along a flow direction of dry air,
wherein the plurality of unit membrane modules are spaced apart to form spaces between each of the plurality of unit membrane modules within the hollow upper case,
wherein the hollow fiber membrane bundle of each unit membrane module comprises of a plurality of hollow fiber membranes having same size in diameter.

2. The membrane humidifier of claim 1, wherein the membrane module assembly comprises at least two unit membrane modules having different diameters.

3. The membrane humidifier of claim 1, wherein the membrane module assembly comprises a unit membrane module having a relatively small diameter and disposed at a central portion of the upper case and unit membrane modules having diameters which become gradually larger than that of the unit membrane module disposed at a portion of the upper case as they go from the center to the outer side of the upper case.

4. The membrane humidifier of claim 1, wherein the hollow lower case includes second wet air inlet apertures and second wet air outlet apertures at outer peripheral portions of opposite ends of the hollow lower housing.

5. An air supply system of a fuel cell, comprising:
an air blower configured to supply dry air to the air supply system;
a membrane humidifier assembly configured to humidify the dry air supplied by the air blower, the membrane humidifier assembly including a hollow upper case including a plurality of first wet air inlet apertures and a plurality of first wet air outlet apertures, and a membrane module assembly including a plurality of singular unit membrane modules separated from each other and received lengthwise within the hollow upper case along a flow direction of dry air; and a fuel cell stack configured to receive the humidified air from the membrane humidifier and supply wet air to the membrane humidifier after a reaction therein, wherein each of the plurality of unit membrane modules comprise a hollow lower case that surrounds a hollow fiber membrane bundle received lengthwise within the hollow lower case along a flow direction of dry air, wherein the plurality of unit membrane modules are spaced apart to form spaces between each of the plurality of unit membrane modules within the hollow upper case, wherein the hollow fiber membrane bundle of each unit membrane module comprises of a plurality of hollow fiber membranes having same size in diameter.

6. The membrane humidifier of claim 5, wherein the membrane module assembly comprises at least two unit membrane modules having different diameters.

7. The membrane humidifier of claim 5, wherein the membrane module assembly comprises a unit membrane module having a relatively small diameter compared to other unit membranes in the membrane module assembly and disposed at a central portion of the upper case, and a plurality of other unit membrane modules having diameters which become gradually larger than that of the unit membrane module disposed at the center portion of the upper case, wherein the diameter of the unit membranes increases from the center to the outer side of the upper case respectively.

8. The membrane humidifier of claim 5, wherein the hollow lower case includes second wet air inlet apertures and second wet air outlet apertures at outer peripheral portions of opposite ends of the hollow lower case.

\* \* \* \* \*